J. A. STUBBLEFIELD.
NUT LOCK.
APPLICATION FILED DEC. 11, 1920.

1,388,317.

Patented Aug. 23, 1921.

Inventor
J. A. Stubblefield
By C.A.Snow&Co.
Attorneys

UNITED STATES PATENT OFFICE.

JOHN ARTHUR STUBBLEFIELD, OF PORTLAND, OREGON.

NUT-LOCK.

1,388,317.  Specification of Letters Patent.  Patented Aug. 23, 1921.

Application filed December 11, 1920. Serial No. 429,978.

*To all whom it may concern:*

Be it known that I, JOHN A. STUBBLEFIELD, a citizen of the United States, residing at Portland, in the county of Multnomah and State of Oregon, have invented a new and useful Nut-Lock, of which the following is a specification.

This invention relates to nut locks, it being the primary object of the invention to provide a nut lock designed to grip the threads of a bolt to eliminate any possibility of the nut moving in an anti-clockwise direction, under the influence of jars or jolts.

A further object of the invention is to provide a nut lock of this character, whereby the nut may be moved in an anti-clockwise direction by a tool such as a wrench or the like, to remove the nut.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1:
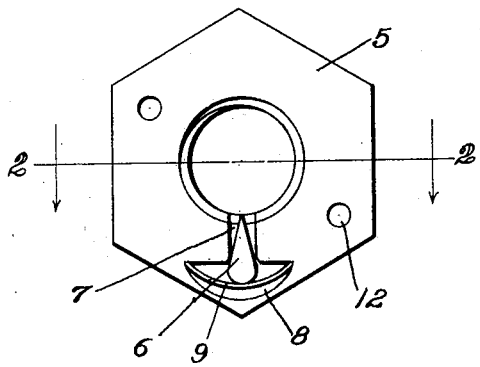
Figure 1 illustrates a bottom plan view of a nut having a locking means constructed in accordance with the present invention, the cover plate being removed.
Figure 2:
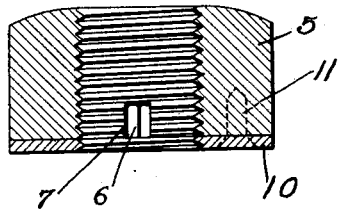
Fig. 2 illustrates a sectional view taken on line 2—2 of Fig. 1.

Referring to the drawing in detail, the reference character 5 designates a nut which is provided with the usual central threaded opening to accommodate a bolt.

The locking feature includes a wedge 6 which is positioned in a lateral opening indicated at 7, which opening is in communication with the central threaded opening of the nut so that the sharp edge of the wedge member 6 may normally lie in a plane with the outer edges of the threads of the central opening.

An opening 8 communicates with the opening 7, and is comparatively large to accommodate the leaf spring 9, that has its ends disposed at the ends of the opening 8, the central portion thereof overlying one end of the opening 7, where the same contacts with the wedge member 6.

As shown, this wedge member has a curved head, which contacts with the spring member 9, to permit the wedge member to pivot or rock within its opening, whereby the locking result may be obtained.

In order that the wedge member and spring 9 may be held within a nut, a cover plate 10 is provided, which cover plate is provided with suitable openings to accommodate the screws 11, that pass through the cover plate and embed themselves in the openings 12 formed in the nut proper.

Figure 3:
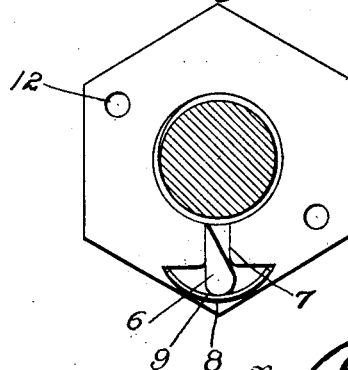
Fig. 3 illustrates a bottom plan view of the nut with the cover plate removed, and showing the nut as positioned on a bolt.

From the foregoing it is obvious that when the nut is operated in a clockwise direction, the wedge member is moved to a position as indicated by Fig. 3 of the drawing, with the result that any movement of the wedge member in an anti-clockwise direction, caused by jarring of the device or structure to which the nut is applied, will cause the wedge member to bite into the threads of the bolt to prevent movement of the nut.

If it is desired to release the nut as by rotating the same with a wrench or similar tool, the action of the wedge member may be overcome, by rotating the nut in an anti-clockwise direction, whereupon the wedge member takes a position opposite to that as shown in Fig. 3 of the drawings, to the end that the nut may be removed.

Upon replacing the nut, the wedge member 6 again takes a position as indicated by Fig. 3 of the drawing, and the nut may now be rotated to seat the same.

Having thus described the invention, what is claimed as new is:—

A nut lock including a body portion having a central threaded opening and having a lateral opening in communication therewith, said nut having an opening providing communication between the threaded opening and lateral opening, a spring member having its ends disposed toward the central threaded opening, a wedge member positioned within the lateral opening and having one end thereof extending beyond the wall of the central threaded opening, said wedge having a curved head contacting with the spring, said spring adapted to urge the wedge towards the central threaded opening, and said wedge member adapted to rock in the lateral opening.

In testimony that I claim the foregoing as my own, I have hereto affixed my signature in the presence of two witnesses.

JOHN ARTHUR STUBBLEFIELD.

Witnesses:
 WILSON T. HUME,
 LEO P. FUNKE.